(12) United States Patent
Kim et al.

(10) Patent No.: US 9,378,589 B2
(45) Date of Patent: Jun. 28, 2016

(54) APPARATUS AND METHOD FOR GENERATING DIGITAL CLONE

(75) Inventors: Ho-Won Kim, Seoul (KR); Bon-Ki Koo, Daejeon (KR); Seung-Wook Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1044 days.

(21) Appl. No.: 13/335,668

(22) Filed: Dec. 22, 2011

(65) Prior Publication Data

US 2012/0162218 A1 Jun. 28, 2012

(30) Foreign Application Priority Data

Dec. 23, 2010 (KR) .................... 10-2010-0133937

(51) Int. Cl.
*G06T 19/00* (2011.01)
*G06T 13/40* (2011.01)

(52) U.S. Cl.
CPC ............... *G06T 19/00* (2013.01); *G06T 13/40* (2013.01)

(58) Field of Classification Search
None
See application file for complete search history.

(56) References Cited

U.S. PATENT DOCUMENTS

| 2005/0033142 A1* | 2/2005 | Madden | A61B 5/0059 600/407 |
| 2008/0031512 A1* | 2/2008 | Mundermann | G06K 9/00342 382/154 |
| 2010/0156935 A1* | 6/2010 | Lim et al. | 345/647 |
| 2010/0158354 A1* | 6/2010 | Kim | G06T 13/40 382/154 |
| 2012/0218262 A1* | 8/2012 | Yomdin | G06T 13/80 345/419 |

FOREIGN PATENT DOCUMENTS

| KR | 1020100072845 | 7/2010 |
| KR | 1020100073174 | 7/2010 |
| KR | 1020100073175 | 7/2010 |

OTHER PUBLICATIONS

Vlasic, Daniel et al., "Articulated Mesh Animation from Multi-view Silhouettes," ACM Transactions on Graphics (TOG)—Proceedings of the ACM SIGGRAPH, vol. 27(3) (2008).

* cited by examiner

*Primary Examiner* — James A Thompson
(74) *Attorney, Agent, or Firm* — Nelson Mullins Riley & Scarborough LLP; Anthony A. Laurentano

(57) ABSTRACT

Disclosed herein is technology for generating a digital clone. An apparatus for generating a digital clone includes a standard human body model generation unit for extracting information about appearance deformations based on joint control angles of joints from posture-based appearance deformation examples, generating a parametric shape control engine in which the appearance deformation information is incorporated, and incorporating the parametric shape control engine in a standard mesh-type human body model, thus generating a standard human body model. A unique human body model generation unit receives multi-view image examples based on a change in a posture of an actor, generates a 3D model of the actor based on multi-view image examples, and transfers the standard human body model to the 3D model, thus generating a unique human body model, in which unique appearance deformations of the actor based on the change in the posture of the actor are reflected.

14 Claims, 15 Drawing Sheets

APPARATUS AND METHOD FOR GENERATING DIGITAL CLONE

CROSS REFERENCE TO RELATED APPLICATION

This application claims the benefit of Korean Patent Application No. 10-2010-0133937, filed on Dec. 23, 2010, which is hereby incorporated by reference in its entirety into this application.

BACKGROUND OF THE INVENTION

1. Technical Field

The present invention relates generally to an apparatus and method for generating a digital clone. More particularly, the present invention relates to an apparatus and method for generating a digital clone, which reconstruct even a deformed portion of the unique appearance of an actor based on the motion of the actor, together with the motion, thus realistically reproducing the behavioral expression of the actor.

2. Description of the Related Art

Generally, three-dimensional (3D) human body models play a very important role in the fields of video content such as 3D games, in addition to computer animation. In order to produce animation of such a human body model, a human body model that enables shape deformations based on controlling the posture of the skeletal structure of a human body to be made must be generated first before the production of the animation.

The generation of a human body model is performed using a character setup or rigging task that defines a skeletal structure obtained by approximating the skeletal system of a human body to a mesh or surface model that represents the appearance of a desired human body, and that causes the appearance of the human body to be deformed by controlling the movement and rotation of individual joints of the skeletal structure.

Such a rigging task is an operation that causes the deformations in the appearance of a human body to take place depending on the movement and rotation of joints by binding mesh vertexes or surface vertexes of the appearance connected to each joint of the skeletal structure. Further, such a rigging task is an operation that approximates the muscular structure of a human body, binds the approximated muscular structure to the skeletal structure, and binds a muscle to adjacent mesh vertexes or surface vertexes, so that the joints of the skeletal structure are controlled to cause a muscle model to respond to a motion and the vertexes bound to the muscle model to also respond to the motion, thus causing deformations of the appearance of the human body. Upon this rigging task, a commercial tool such as Autodesk Maya has been mainly utilized in the actual field of content creation.

The generation of a human body model performed using this scheme has currently been applied to video content such as movie films. However, the current task of generating human body models is dependent on the manual operation of professional designers, require a lot of work time and transcendental experiences, and also require a lot of computation time to perform shape deformations in high-quality. A more significant problem is that when a geometric shape is deformed in the appearance of a rigged human body model, the task of reworking the entire generation of a human body model is inevitably required.

Further, a technology of generating the unique human body model of an actor from a 3D scanner has a limitation in that unique appearance deformation characteristics, which did not appear when an initial actor model was obtained, are not desirably reconstructed due to the limitations of a mesh-based local shape deformation method that is used to deform the appearance of a human body.

In addition, a technology for generating the unique human body model of an actor from multi-view images of principal frames is disadvantageous in that since the appearance deformations of an actor based on the motions of individual frames are reconstructed using the appearance information of an initial actor model, dependence on the appearance precision of the initial actor model is high.

SUMMARY OF THE INVENTION

Accordingly, the present invention has been made keeping in mind the above problems occurring in the prior art, and an object of the present invention is to realistically reproduce the behavioral expression of an actor by reconstructing even a deformed portion of the unique appearance of the actor based on the motion of the actor, together with the motion.

Another object of the present invention is to promptly and easily generate a digital clone in which the deformations of the appearance of an actor based on the unique behavior of the actor are reflected.

A further object of the present invention is to generate a digital clone in which the deformations of a realistic appearance shape can be desirably reflected even if joints are excessively controlled.

In order to accomplish the above objects, the present invention provides an apparatus for generating a digital clone, including a standard human body model generation unit for extracting information about appearance deformations based on joint control angles of joints from posture-based appearance deformation examples, generating a parametric shape control engine in which the appearance deformation information is incorporated, and incorporating the parametric shape control engine in a standard mesh-type human body model, thus generating a standard human body model; and a unique human body model generation unit for receiving multi-view image examples based on a change in a posture of an actor as input, generating a three-dimensional (3D) model of the actor based on the multi-view image examples, and transferring the standard human body model to the 3D model, thus generating a unique human body model, in which unique appearance deformations of the actor based on the change in the posture of the actor are reflected.

Preferably, the standard human body model generation unit may include a skeletal structure generation unit for receiving the standard mesh-type human body model and generating the skeletal structure of the standard mesh-type human body model; a keyframe generation unit for generating a plurality of keyframes required to approximate the appearance of the standard mesh-type human body model along the skeletal structure; and a parametric shape control engine generation unit for extracting the appearance deformation information based on the joint control angles of the joints from the posture-based appearance deformation examples, and generating a parametric shape control engine in which response relationships of sections of individual keyframes are modeled in consideration of the appearance deformation information.

Preferably, the standard human body model generation unit may further include an example-based parameter learning unit for rendering the keyframes and the skeletal structure using the response relationships, comparing rendered results with the posture-based appearance deformation examples, and then updating response parameter values of the response relationships so that errors in 3D locations of individual vertexes of a mesh structure are reduced.

Preferably, the parametric shape control engine generation unit may model the response relationships so that shapes of the keyframes are parametrically deformed depending on the joint control angles of the joints.

Preferably, the parametric shape control engine generation unit may model the response relationships so that the shapes of the keyframes are deformed by responding to joint control angles of joints neighboring each relevant joint in a multi-response manner.

Preferably, each of the keyframes is formed to include a center point intersecting the skeletal structure and feature points at which a 3D plane of the keyframe intersects meshes of the standard mesh-type human body model, and the plurality of keyframes are configured to include joint keyframes intersecting the joints of the skeletal structure.

Preferably, the parametric shape control engine may assign a degree of freedom, which is parametrically deformed depending on the joint control angles, to the joint keyframes so that 3D location values of the joint keyframes change depending on the joint control angles of the joints.

Preferably, the parametric shape control engine may perform control such that a length of radii from the center point of each keyframe to the feature points changes depending on the joint control angles.

Preferably, the unique human body model generation unit may include an appearance reconstruction unit for receiving the multi-view image examples of the actor, reconstructing 3D geometric appearance information of the actor, and then generating the 3D model; a posture estimation unit for estimating locations of joints of a skeletal structure of the 3D model using anthropometric analysis of the skeletal structure, and then generating an estimated 3D model; a standard human body model transfer unit for collecting unique response relationships based on the joint control angles of the joints from the 3D model, and transferring the standard human body model to the estimated 3D model to correspond to the estimated 3D model; and a parameter adaptation unit for changing parameter values of the parametric shape control engine so that appearance deformations based on a unique motion of the actor can be reflected using information about the unique response relationships collected by the standard human body model transfer unit.

Preferably, the standard human body model generation unit may further include a texture map creation unit for creating a texture map for the standard human body model, and the unique human body model generation unit may apply texture information about the multi-view image examples as weights of visibility, and incorporates the weights in the texture map for the standard human body model.

Further, in order to accomplish the above objects, the present invention provides a method of generating a digital clone, including receiving a standard mesh-type human body model; extracting pieces of information about appearance deformations based on joint control angles of joints from posture-based appearance deformation examples; generating a parametric shape control engine in which the appearance deformation information is incorporated; generating a standard human body model by incorporating the parametric shape control engine in the standard mesh-type human body model; receiving multi-view image examples based on a change in posture of an actor; analyzing three-dimensional (3D) geometric appearance information of the actor using the multi-view image examples, and then reconstructing a 3D model; and transferring the standard human body model to the 3D model, and then generating a unique human body model in which unique appearance deformations based on the change in the posture of the actor are reflected.

Preferably, the method may further include generating a skeletal structure of the standard mesh-type human body model to correspond to appearance information of the standard mesh-type human body model; and generating a plurality of keyframes required to approximate appearance of the standard mesh-type human body model along the skeletal structure.

Preferably, the generating the parametric shape control engine may be configured to model response relationships of sections of individual keyframes in consideration of the appearance deformation information, thus generating the parametric shape control engine.

Preferably, the method may further include rendering the keyframes and the skeletal structure using the response relationships; and comparing rendered results with the posture-based appearance deformation examples, and then updating response parameter values of the response relationships so that errors in 3D locations of individual vertexes of a mesh structure are reduced.

Preferably, the generating the parametric shape control engine may be configured to model the response relationships so that shapes of the keyframes are parametrically deformed depending on the joint control angles of the joints.

Preferably, the generating the parametric shape control engine may be configured to model the response relationships so that the shapes of the keyframes are deformed by responding to joint control angles of joints neighboring each relevant joint in a multi-response manner.

Preferably, each of the keyframes may be formed to include a center point intersecting the skeletal structure and feature points at which a 3D plane of the keyframe intersects meshes of the standard mesh-type human body model, and the plurality of keyframes may be configured to include joint keyframes intersecting the joints of the skeletal structure.

Preferably, the parametric shape control engine may assign a degree of freedom, which is parametrically deformed depending on the joint control angles, to the joint keyframes so that 3D location values of the joint keyframes change depending on the joint control angles of the joints.

Preferably, the parametric shape control engine may perform control such that a length of radii from the center point of each keyframe to the feature points changes depending on the joint control angles.

Preferably, the method may further include estimating locations of the joints of the skeletal structure of the 3D model using anthropometric analysis of the skeletal structure, and then generating an estimated 3D model; and collecting unique response relationships based on the joint control angles of the joints from the 3D model, and changing parameter values of the parametric shape control engine so that appearance deformations based on a unique motion of the actor can be reflected using information about the unique response relationships.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
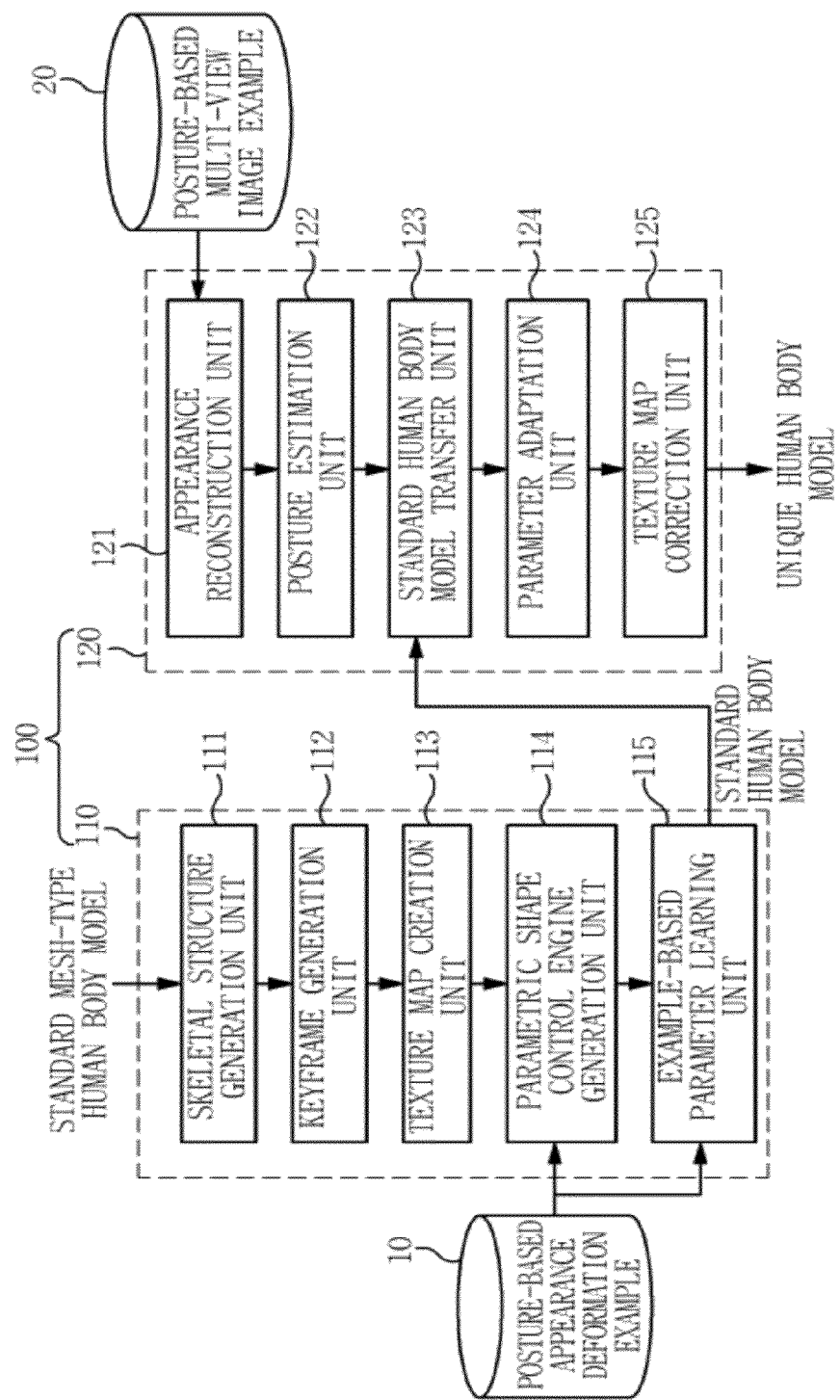
FIG. 1 is a block diagram showing the construction of an apparatus for generating a digital clone according to the present invention.

The present invention will be described in detail below with reference to the accompanying drawings. In the following description, redundant descriptions and detailed descriptions of known functions and elements that may unnecessarily make the gist of the present invention obscure will be omitted. Embodiments of the present invention are provided to fully describe the present invention to those having ordinary knowledge in the art to which the present invention pertains. Accordingly, in the drawings, the shapes and sizes of elements may be exaggerated for the sake of a clearer description.

Hereinafter, the construction and operation of an apparatus for generating a digital clone according to the present invention will be described in detail.

Figure 2:
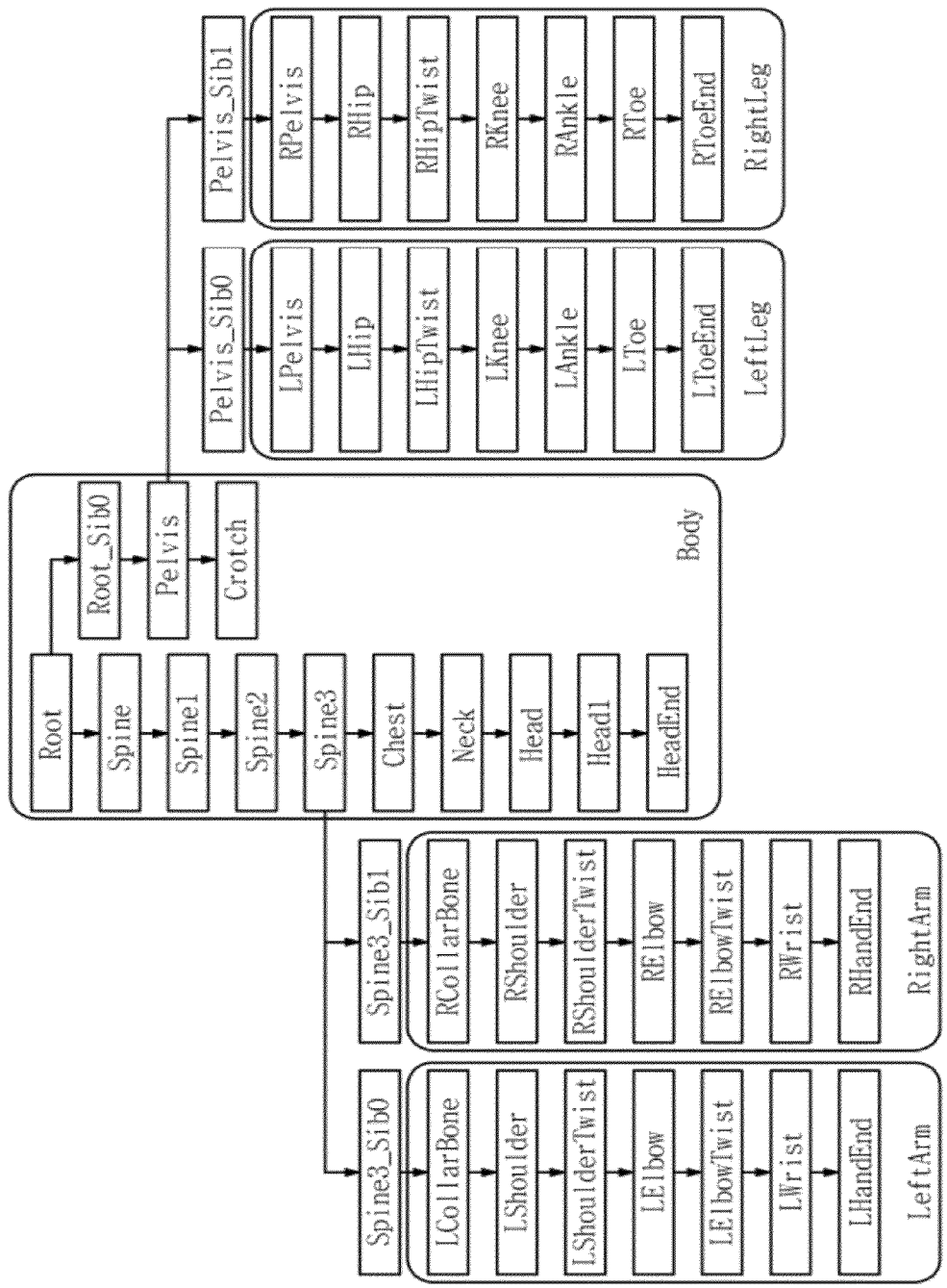
FIG. 2 is a diagram illustrating the hierarchical tree of a skeletal structure.
Figure 3:
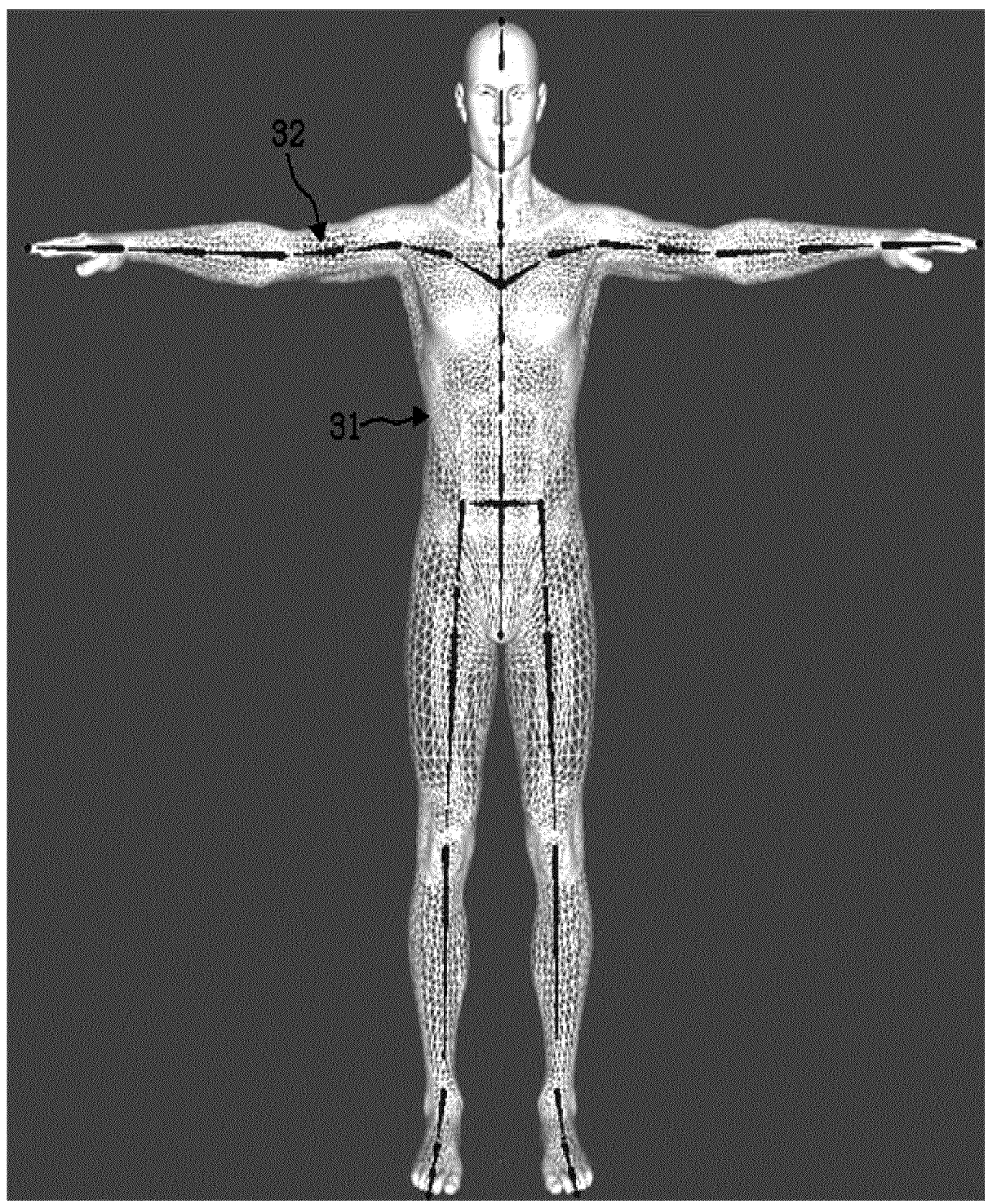
FIGS. 3 to 6 are diagrams showing a standard human body model according to the present invention.
Figure 8:
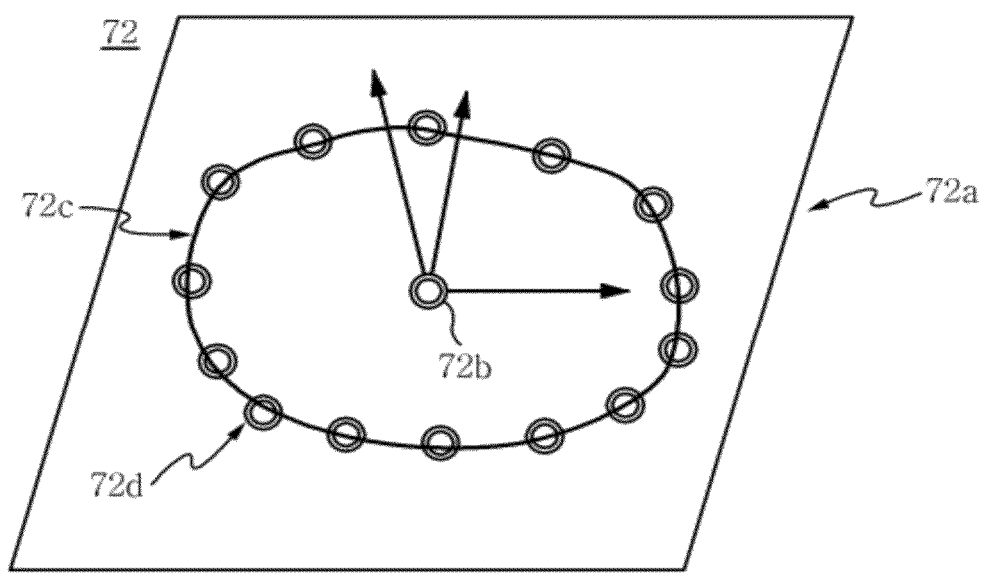
FIG. 8 is a diagram showing a keyframe.
Figure 9:
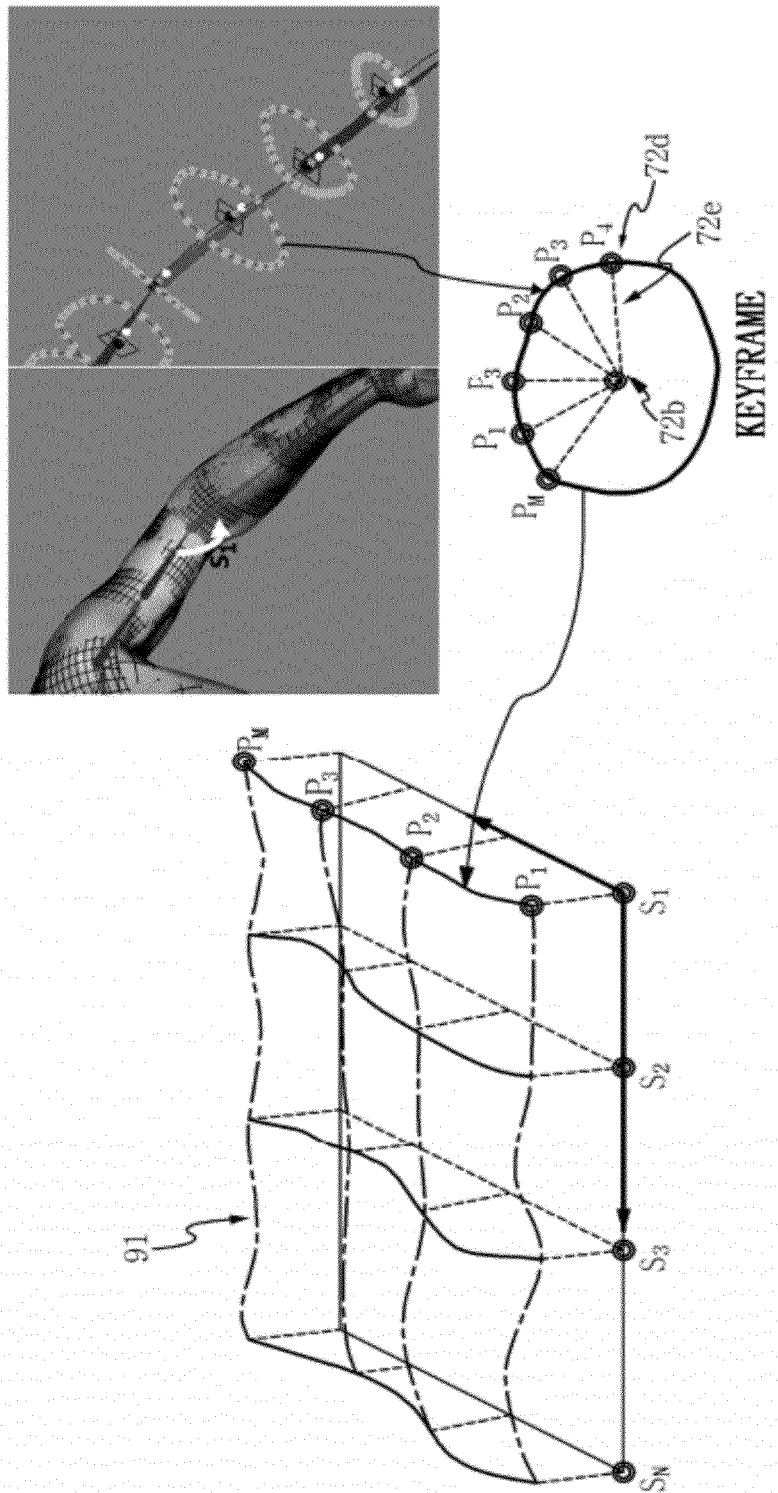
FIG. 9 is a conceptual diagram showing the response relationship of keyframes modeled by the control of a skeletal structure.
Figure 10:
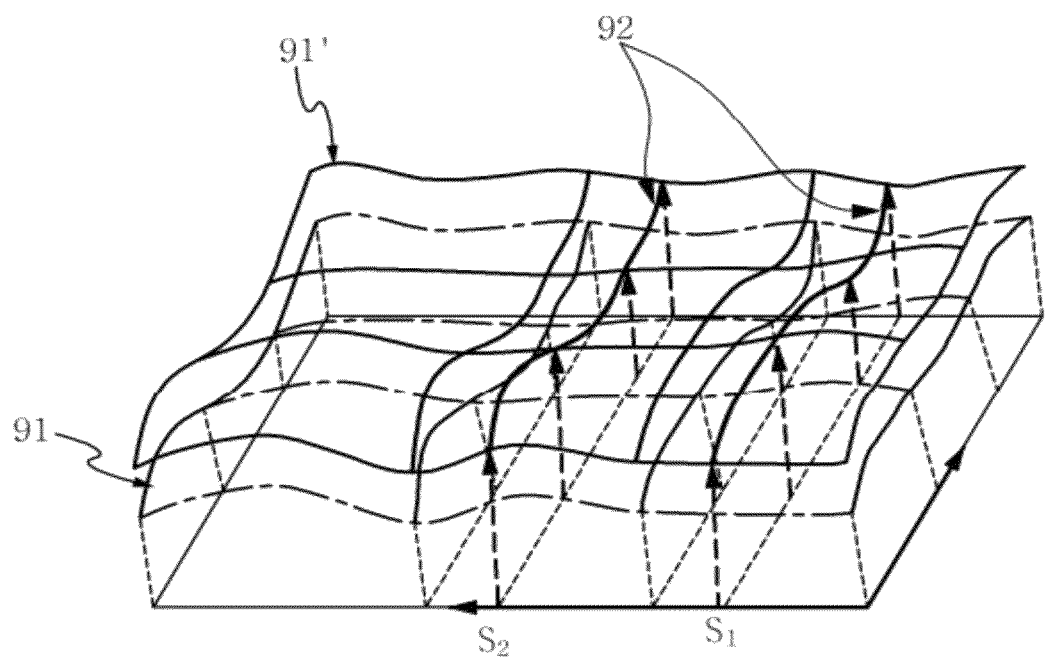
FIG. 10 is a diagram showing a modification of the response relationship of the keyframes of FIG. 9 obtained when parameter values are applied according to the present invention.

FIG. 1 is a block diagram showing the construction of an apparatus for generating a digital clone according to the present invention. FIG. 2 is a diagram illustrating the hierarchical tree of a skeletal structure. FIGS. 3 to 6 are diagrams showing a standard human body model according to the present invention. FIGS. 7A to 7D are diagrams showing the concept of shape deformations based on the deformation of the posture of a human body. FIG. 8 is a diagram showing a keyframe. FIG. 9 is a conceptual diagram showing the response relationship of keyframes modeled by the control of a skeletal structure. FIG. 10 is a diagram showing a modification of the response relationship of the keyframes of FIG. 9 obtained when parameter values are applied according to the present invention.

Referring to FIG. 1, an apparatus 100 for generating a digital clone according to the present invention includes a standard human body model generation unit 110 and a unique human body model generation unit 120.

The standard human body model generation unit 110 receives a standard mesh-type human body model as input. Further, the standard human body model generation unit 110 extracts information about appearance deformations based on the joint control angles of joints from posture-based appearance deformation examples 10. Furthermore, the standard human body model generation unit 110 generates a parametric shape control engine in which the appearance deformation information is incorporated. Furthermore, the standard human body model generation unit 110 finally generates a standard human body model by applying the parametric shape control engine to the standard mesh-type human body model.

Such a standard human body model generation unit 110 may include in detail a skeletal structure generation unit 111, a keyframe generation unit 112, a texture map creation unit 113, a parametric shape control engine generation unit 114, and an example-based parameter learning unit 115.

The skeletal structure generation unit 111 receives the standard mesh-type human body model and then generates the skeletal structure of the standard mesh-type human body model. Referring to FIG. 1 together with FIG. 3, the skeletal structure generation unit 111 receives a standard mesh-type human body model 31 for a standard body type, which has been generated based on anthropometry. Further, the skeletal structure generation unit 111 generates the skeletal structure 32 of the standard mesh-type human body model 31. In this case, as shown in FIG. 2, the skeletal structure 32 can be modeled in the form of a branched tree structure. Further, the actual three-dimensional (3D) locations of the nodes of each tree structure are generated using the Graphical User Interface (GUI)-based input by a user or using the anthropometric analysis of the skeletal structure. Such a skeletal structure can be freely defined based on what the user desires within the category of a skeletal system.

Figure 4:
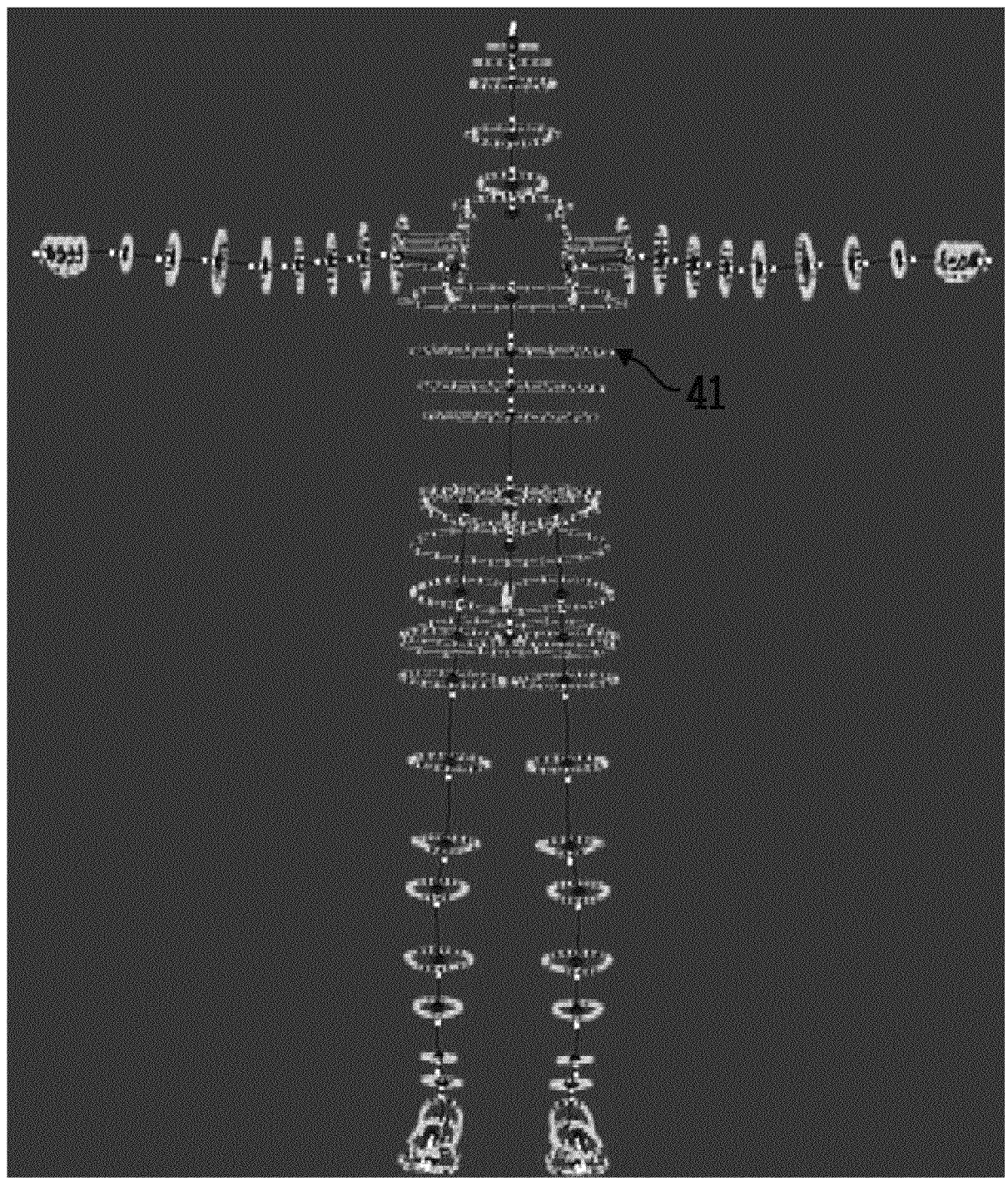

The keyframe generation unit 112 generates a plurality of keyframes required to approximate the appearance of the standard mesh-type human body model along the skeletal structure. In this case, each of the keyframes is formed to include a center point intersecting the skeletal structure and feature points at which the 3D plane of the keyframe and the meshes of the standard mesh-type human body model intersect. Further, the keyframes may be configured to include joint keyframes intersecting the joints of the skeletal structure. In this case, the keyframe generation unit 112 aligns the center points of the joint keyframes with the joints. Furthermore, the keyframe generation unit 112 aligns the center of gravity of each of curves of the keyframes except for the joint keyframes, with the skeletal structure. The locations and number of the keyframes can be freely set so that the 3D shape of the human body model can be desirably approximated. The detailed construction of each keyframe will be described later with reference to FIG. 8. In FIG. 4, an example in which a plurality of keyframes 41 are generated along the skeletal structure of the standard mesh-type human body model is shown.

The texture map creation unit 113 creates a texture map for a standard human body model. That is, referring to the drawings together with FIG. 6, the texture map creation unit 113 creates a texture map 61 to be applied to a standard human body model 60.

Figure 5:
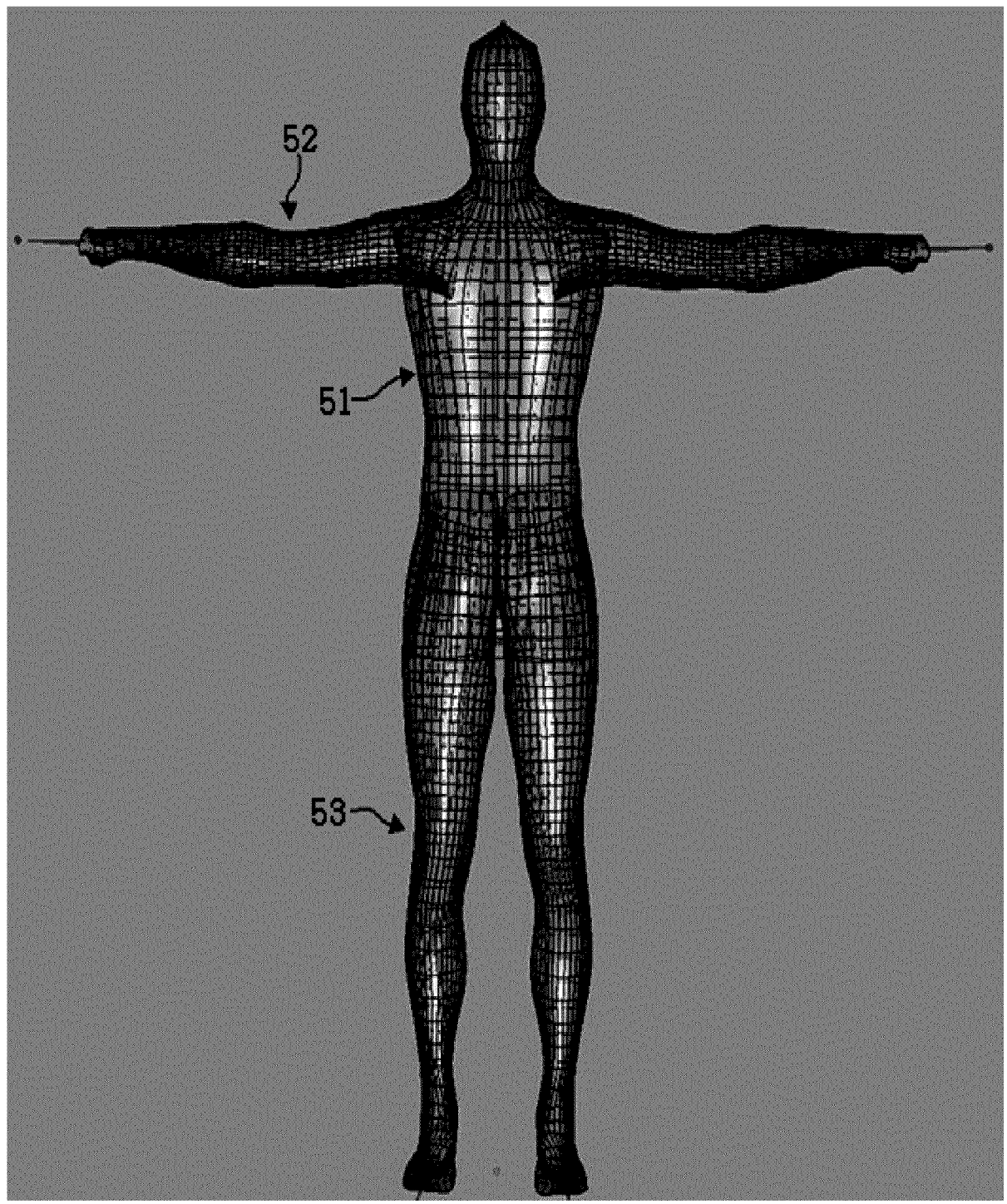
Figure 6:
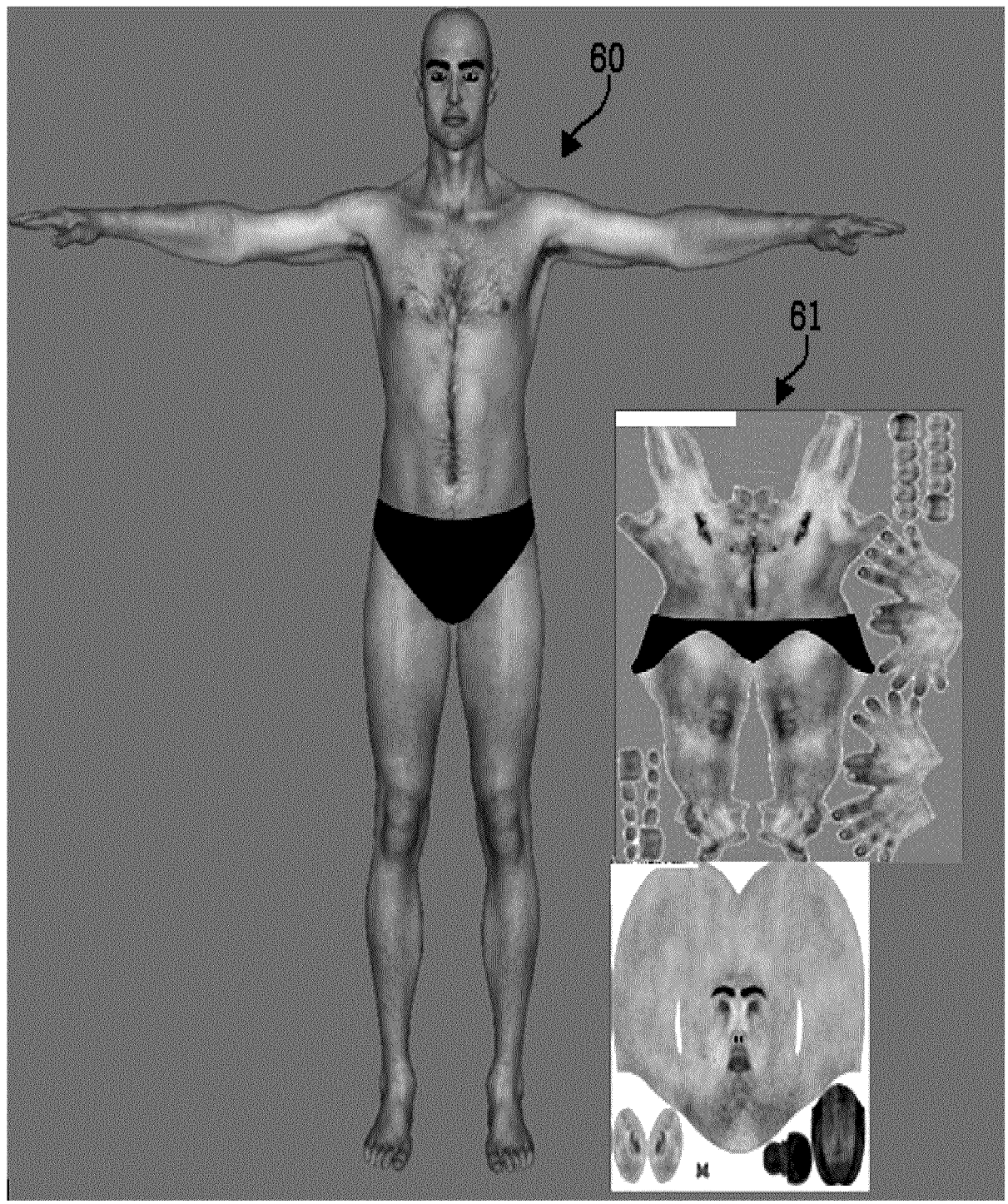
Figure 7A:
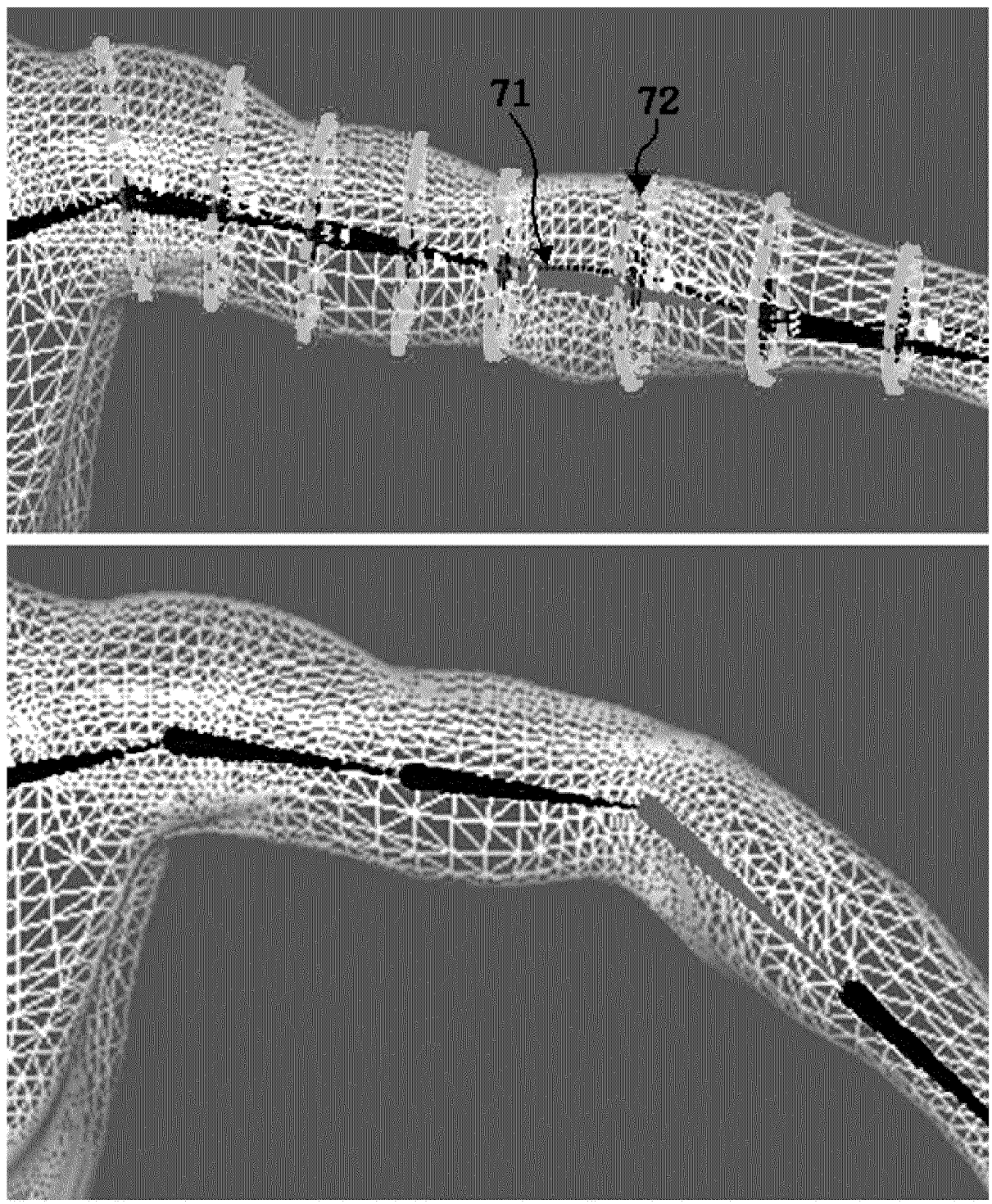
FIGS. 7A to 7D are diagrams showing the concept of shape deformations based on the deformations of the posture of a human body.
Figure 7B:
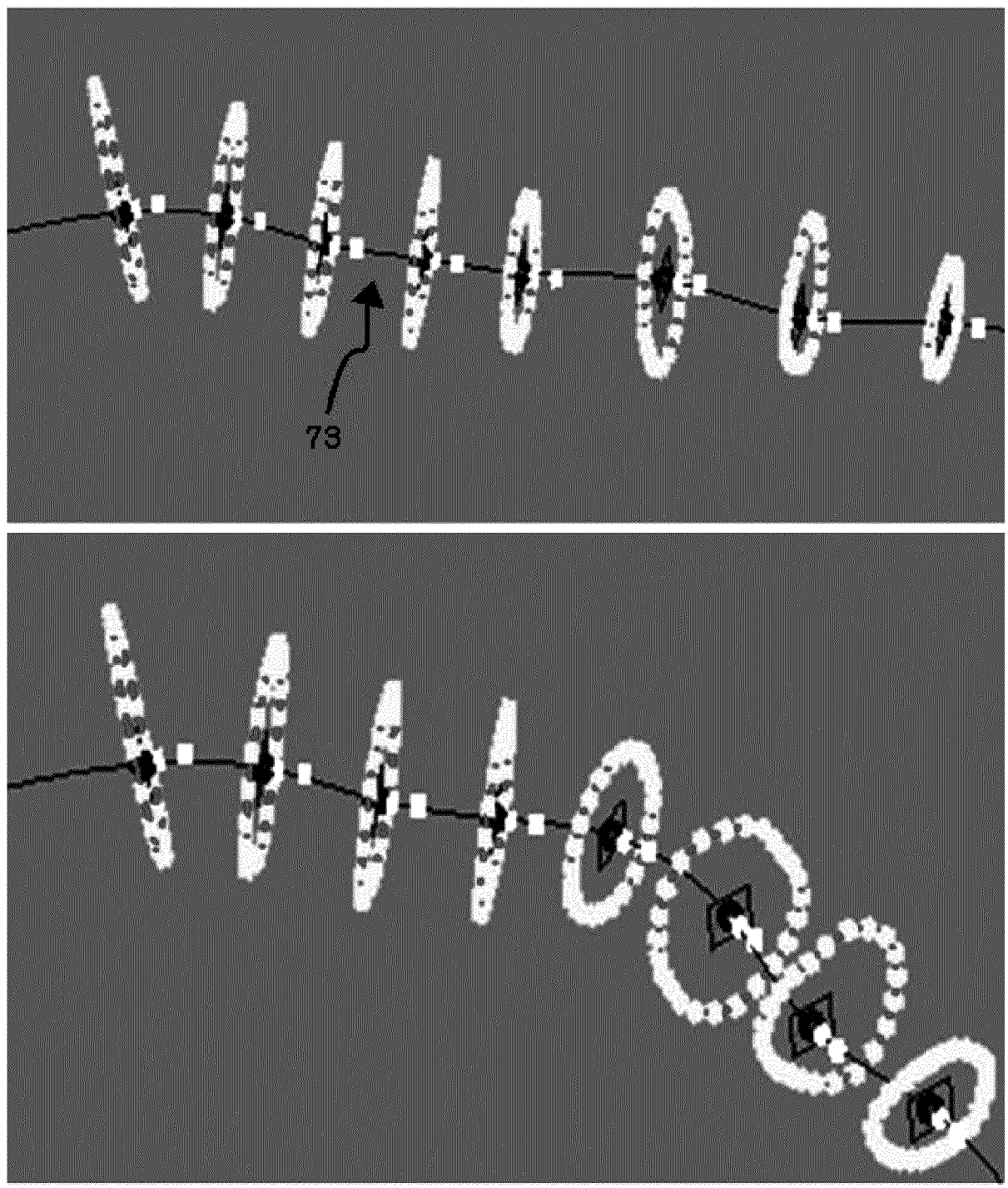
Figure 7C:
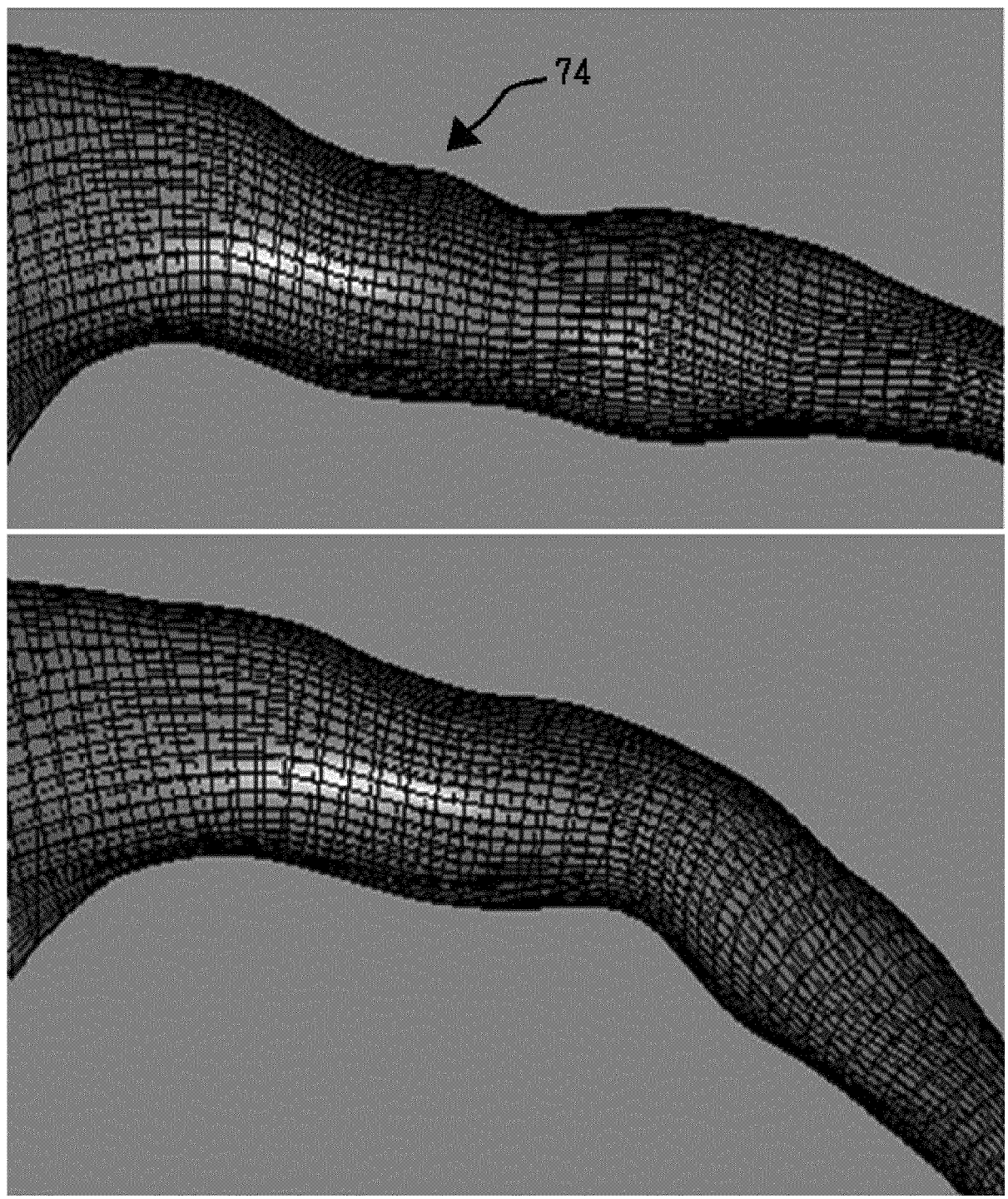
Figure 7D:
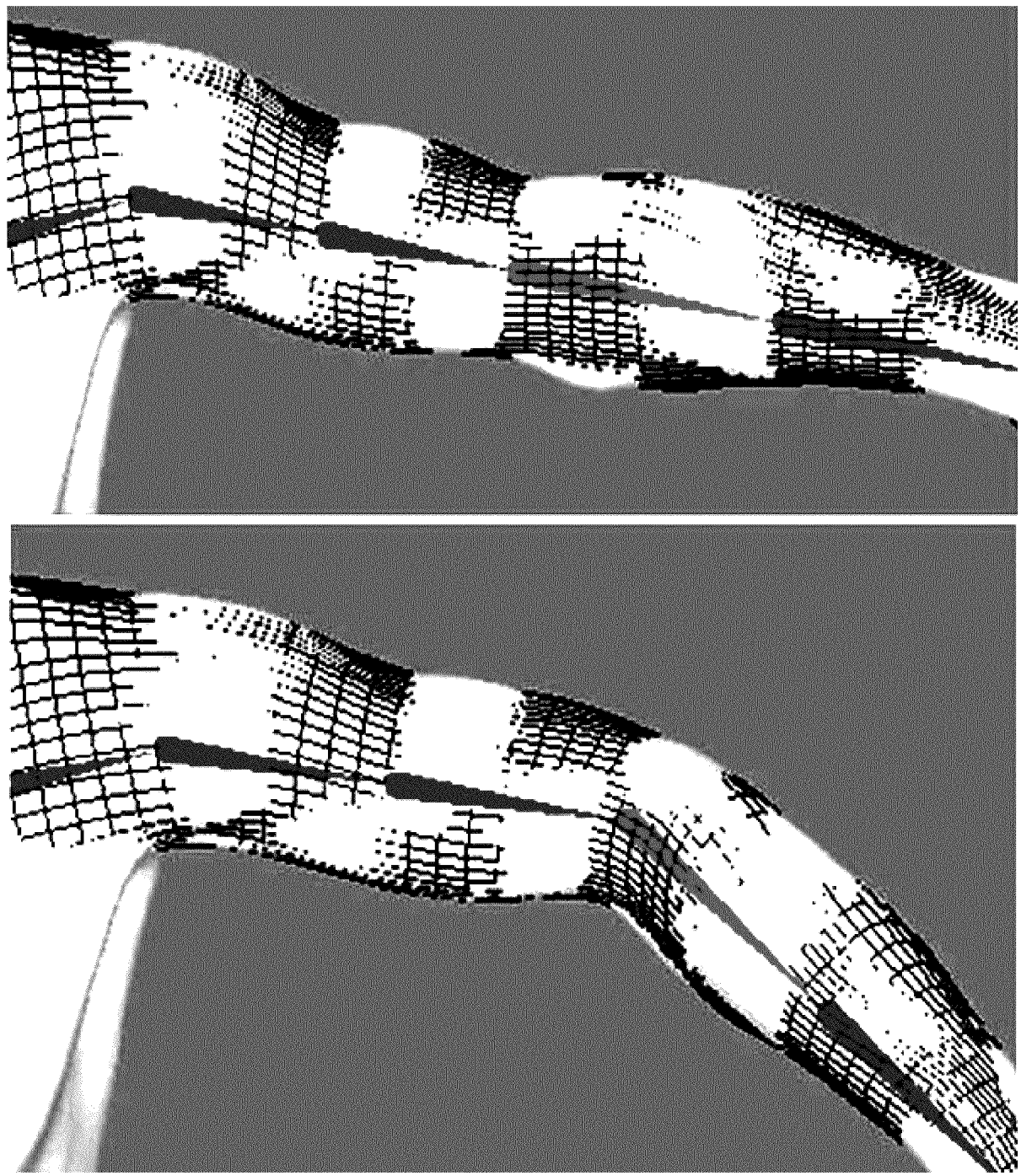

The parametric shape control engine generation unit 114 extracts appearance deformation information based on the joint control angles of joints from the posture-based appearance deformation examples 10. Further, the parametric shape control engine generation unit 114 generates a parametric shape control engine in which the response relationships of the sections of the individual keyframes are modeled in consideration of the appearance deformation information. Furthermore, the parametric shape control engine generation unit 114 models the response relationships so that the shapes of the keyframes are parametrically deformed depending on the joint control angles of the joints. In addition, the parametric shape control engine generation unit 114 models the response relationships so that the shapes of the keyframes are deformed by responding to the joint control angles of joints neighboring each relevant joint in a multi-response manner. In this case, the parametric shape control engine may assign to the joint keyframes the degree of freedom that is parametrically deformed depending on the joint control angles so that the 3D location values of the joint keyframes change depending on the joint control angles of the joints. Further, the parametric shape control engine may perform control such that the length of the radii from the center point of each keyframe to the feature points changes depending on the joint control angles. That is, for each keyframe that leads the actual appearance shape deformations depending on the posture control of the skeletal structure, a Non-Uniform Rational B-Splines (NURBS) trajectory curve at the center point and feature points are defined as response factors which respond to control parameters composed of rotation angles of the joints used to control the skeletal structure. The response factors must be dependent on changes in the control parameters. In this case, in order to reduce the degree of freedom of response factors based on posture control, control feature points are sampled at regular intervals around the center point, and a radius variable is used instead of a location variable having three degrees of freedom. For example, when the control feature points are sampled at 10-degree intervals, the feature points can be represented by variables having 36 degrees of freedom, and the trajectory curve can be represented by a variable having six degrees of freedom. In the case of joints, when individual joints are just rotated, a knee joint can be represented by one degree of freedom, a shoulder joint can be represented by a maximum of three degrees of freedom, and a root joint that enables even movement can be represented by six degrees of freedom. Further, the digital clone generation apparatus according to the present invention uses a parametric shape control scheme to control the appearance and the posture of the actor. For this, as shown in FIG. 5, the human body is divided into five parts, such as a body 51, left/right arms 52, and left/right legs 53, with respect to a skeletal structure. Further, for each part, a parametric sweep surface structure in which a standard shape is approximated is formed using a parametric sweep surface, represented by a parametric NURBS curve and a NURBS surface. Further, the parametric shape control engine is used to deform the shape of the appearance in accordance with the control of the posture of the joints of the skeletal structure by binding individual vertexes of the sweep surface structure and the mesh structure to one another.

In this case, pieces of shape information in which the motion characteristics of the actual skeleton and the muscular system are incorporated are stored on the sections of the appearance perpendicularly intersecting the direction of movement of the skeletal structure for individual postures of the skeletal structure. Pieces of shape section information of the appearance for individual postures, which intersect the 3D plane of each keyframe, may be examples of response factors for respective control parameters for which modeling is desired using the present invention. When these pieces of shape section example information are collected for individual postures, a response relationship 91 having a specific pattern can be generated, as shown in FIG. 9. FIG. 9 is a diagram in which in order to describe a response relationship, pieces of information about radii 72e from each of the center points 72b, $S_1$, $S_2$, $S_3$, and $S_4$ of the keyframes to individual feature points 72d, $P_1$, $P_2$, $P_3$, $P_4$, and $P_M$ are schematized as a function of a single joint rotation angle control parameter dependent on the relevant keyframe. The actual response relationship has a multi-dimensional function relationship rather than the schematized 3D function relationship.

Most response relationships have non-linear characteristics, but may be represented desirably using linear approximation when the number of samples increases. Such response relationships may be modeled using relational expressions on the basis of a linear function solution such as Singular Value Decomposition (SVD) or a Jacobian-based linear approximation optimization method. However, in such a modeling procedure, most control parameters that actually influence the response factors of each keyframe are limited to joint rotation angles of the skeleton structure adjacent to the relevant keyframe. Further, the response relationships may be simplified using a procedure for analyzing principal components in the modeling procedure, with respect to the control parameters that actually influence response factors in this way. Since this modeling in the present invention is independent of an increase in the number of examples, and is represented by a small number of parameters, there are advantages in that remodeling and deformation can be easily performed for new input examples, the appearance can be easily deformed with respect to different appearance characteristics of individual persons based on height, obesity, gender, and age, and scarcely any computation time is required to deform the appearance.

The example-based parameter learning unit 115 renders the skeletal structure and the keyframes, respectively generated by the skeletal structure generation unit 111 and the keyframe generation unit 112, using the response relationships modeled by the parametric shape control engine generation unit 114. Further, the example-based parameter learning unit 115 compares the rendered results with the posture-based appearance deformation examples 10, and then updates the response parameter values of the response relationships so that errors in the 3D locations of individual vertexes of the mesh structure can be reduced.

FIGS. 7A to 7D illustrate a skeletal structure 71, keyframes 72 formed along the skeletal structure 71, a NURBS trajectory curve 73 defined to intersect the feature points of the keyframes 72, and a sweep surface 74.

In FIG. 8, an example of the section of each keyframe 72 is depicted. That is, the keyframe 72 includes a center point 72b on a 3D plane 72a, a curve 72c generated by connecting intersection points of adjacent meshes that intersect the 3D plane 72a, and feature points 72d required to approximate the curve 72c.

The unique human body model generation unit 120 receives the posture-based multi-view image examples 20 of an actor as input. Further, the unique human body model generation unit 120 generates a 3D model of the actor using the multi-view image examples 20 of the actor. Furthermore, the unique human body model generation unit 120 transfers a standard human body model to the 3D model, thus generating a unique human body model in which the deformations of the unique appearance based on a change in the posture of the actor are reflected.

The unique human body model generation unit 120 may include an appearance reconstruction unit 121, a posture estimation unit 122, a standard human body model transfer unit 123, a parameter adaptation unit 124, and a texture map correction unit 125.

The appearance reconstruction unit 121 receives the multi-view image examples 20 of the actor. Further, the appearance reconstruction unit 121 reconstructs the 3D geometric appearance information of the actor, and then generates a 3D model.

The posture estimation unit 122 estimates the locations of the joints of the skeletal structure of the 3D model using anthropometric analysis of the skeletal structure, and thus generates an estimated 3D model.

The standard human body model transfer unit 123 collects unique response relationships based on the joint control angles of the joints from the 3D model. Further, the standard human body model transfer unit 123 transfers the standard human body model to the estimated 3D model so that the standard human body model corresponds to the estimated 3D model.

The parameter adaptation unit 124 changes parameter values of the parametric shape control engine so that the appearance deformations based on the unique motion of the actor can be incorporated in the parameter values using information about the unique response relationships collected by the standard human body model transfer unit 123. The degrees of shape deformations of most human bodies for the joint control angles are different depending on age, gender, obesity level, and size. However, since the characteristics of the skeletal system and the muscular system which lead such shape deformations are identical, a regular tendency is maintained. Further, the parameter adaptation unit 124 changes the parameter values of the parametric shape control engine by means of relatively simple application such as scaling or offsets using pieces of information about unique response relationships sampled for individual persons.

As shown in the example shown in FIG. 10, the parameter adaptation unit 124 remodels (91') the modeling parameters of the keyframe-based response relationship information 91 of the standard human body model so that the shape deformations based on the unique motion of the actor can be accommodated using a small number of unique response relationships 92 collected by the standard human body model transfer unit 123.

The texture map correction unit 125 applies the texture information of the multi-view image examples 20 as weights of visibility, and then incorporates the texture information in the texture map of the standard human body model. That is, the texture map correction unit 125 may incorporate the texture information of each camera image having visibility in the texture map of the standard human body model by applying the texture information as weights on the basis of a visibility test conducted on the mesh structure of the transferred standard human body model for each camera. Further, the texture map correction unit 125 may provide texture information dependent on postures if the multi-view image examples do not provide texture information nor conform to Lambertian surface reflection depending on the reflection characteristics of the surface. The texture information that is not provided for a specific posture can be utilized by applying weights to information about adjacent example postures and combining them using an inpainting technique. Further, the texture information dependent on postures may be separated into diffused texture components and specular texture components using equations for approximately modeling the surface reflection characteristics such as those of a Bidirectional Reflectance Distribution Function (BRDF) model. The diffused texture components and the specular texture components can be separately stored, so that surface color values can be reproduced in conformity with the environment of new rendering illumination.

Hereinafter, a method of generating a digital clone according to the present invention will be described in detail.

Figure 11:
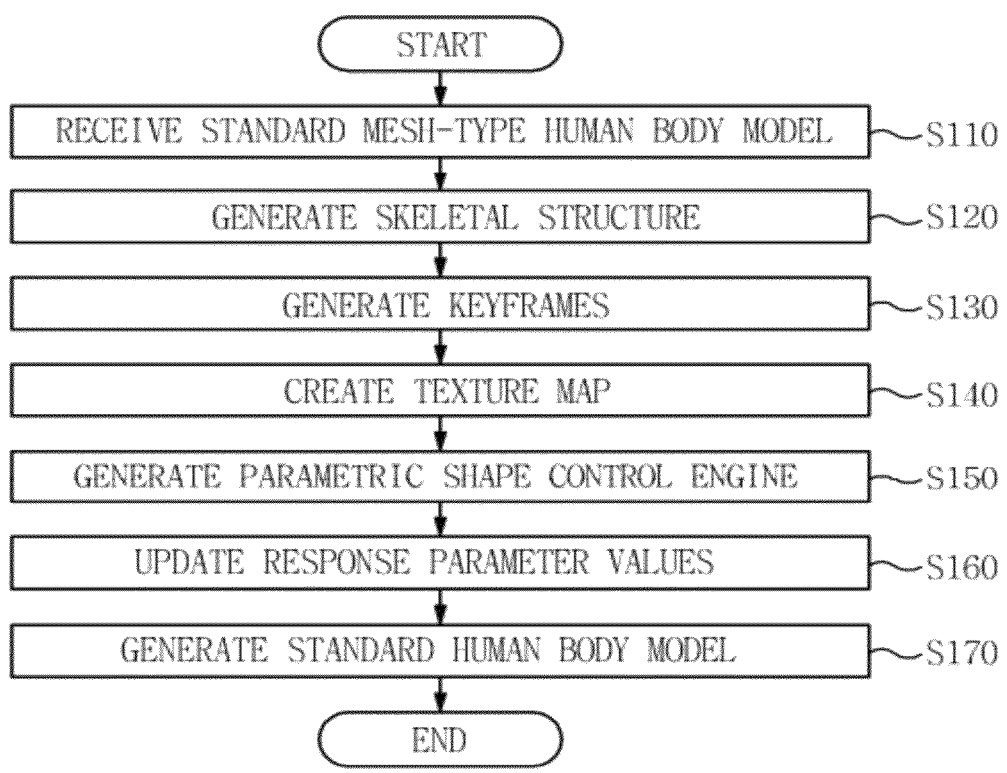
FIGS. 11 and 12 are operating flowcharts showing a method of generating a digital clone according to the present invention.
Figure 12:
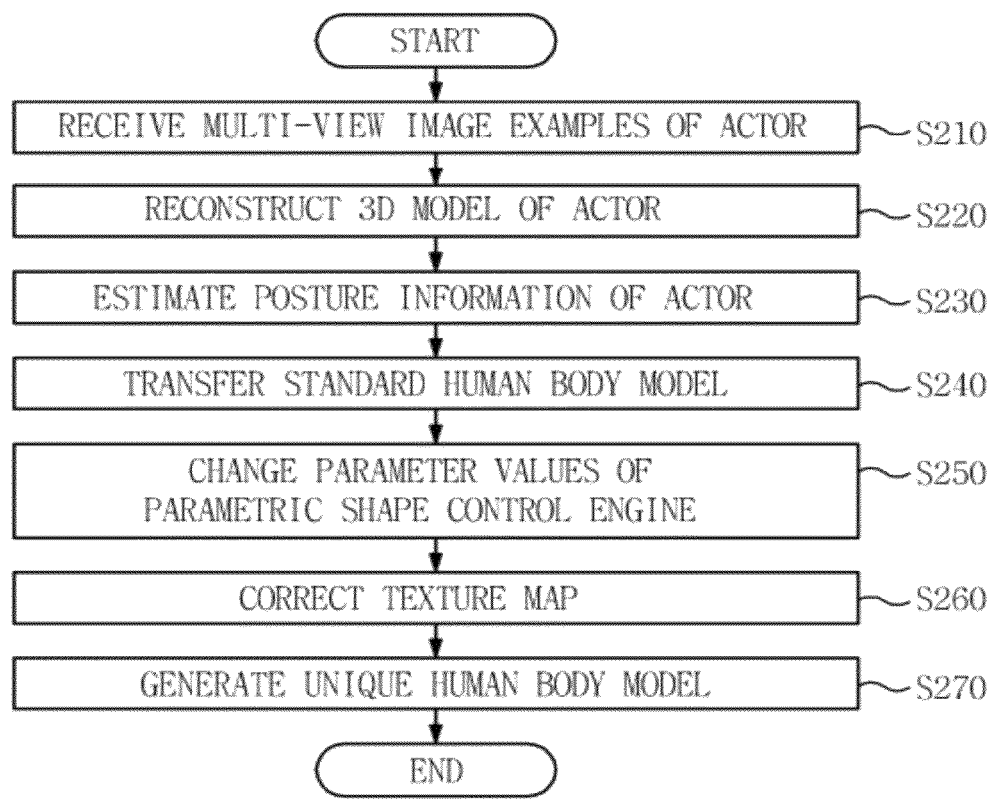

FIGS. 11 and 12 are operating flowcharts showing a method of generating a digital clone according to the present invention. That is, FIG. 11 is a flowchart showing a method of generating a standard human body model in the digital clone generation method according to the present invention. FIG. 12 is a flowchart showing a method of generating a unique human body model using the standard human body model of FIG. 11 in the digital clone generation method according to the present invention.

Referring to FIG. 11, in the digital clone generation method according to the present invention, the method of generating a standard human body model is configured to primarily receive a standard mesh-type human body model as input at step S110.

Further, the skeletal structure of the standard mesh-type human body model is generated to correspond to the appearance information of the standard mesh-type human body model at step S120.

Further, a plurality of keyframes required to approximate the appearance of the standard mesh-type human body model are generated along the skeletal structure at step S130. In this case, each of the plurality of keyframes is formed to include a center point intersecting the skeletal structure, and feature points at which the 3D plane of the keyframe and the meshes of the standard mesh-type human body model intersect. Further, the keyframes may be configured to include joint keyframes intersecting the joints of the skeletal structure.

Next, a texture map for a standard human body model is created at step S140.

Pieces of information about appearance deformations based on joint control angles of the joints are extracted from posture-based appearance deformation examples. Further, a parametric shape control engine is generated in consideration of the extracted appearance deformation information at step S150. Here, at step S150, the response relationships of the sections of individual keyframes are modeled in consideration of the extracted appearance deformation information, and thus the parametric shape control engine can be generated. In this case, at step S150, the response relationships can be modeled so that the shapes of the keyframes are parametrically deformed depending on the joint control angles of the joints. Furthermore, at step S150, the response relationships can be modeled so that the shapes of the keyframes are deformed by responding in multi-response manner to the joint control angles of joints neighboring a relevant joint. In this case, the shape control engine can assign the degree of freedom, which is parametrically deformed depending on the joint control angles, to the joint keyframes so that the 3D location values of the joint keyframes change depending on the joint control angles of the joints. Further, the parametric shape control engine can perform control such that the length of the radii from the center point of each keyframe to the feature points changes depending on the joint control angles.

The keyframes and the skeletal structure are rendered using the response relationships that have been modeled at step S150. Further, the rendered results are compared with the posture-based appearance deformation examples, so that the response parameter values of the response relationships are updated so that errors in the 3D locations of individual vertexes of the mesh structure are reduced at step S160.

Next, the parametric shape control engine is incorporated in the standard mesh-type human body model, and thus the standard human body model is generated at step S170.

The standard human body model generated as described above is used to generate a unique human body model, and this process will be described in detail below.

Referring to FIG. 12, the method of generating a unique human body model in the digital clone generation method according to the present invention is configured to primarily receive multi-view image examples based on a change in the posture of an actor at step S210.

Further, the 3D geometric appearance information of an actor is analyzed using the multi-view image examples, and then a 3D model is reconstructed at step S220.

The locations of the individual joints of the skeletal structure defined in a standard model for the 3D model reconstructed at step S220 are estimated based on the GUI of the user or using anthropometric analysis of the skeletal structure at step S230. That is, the locations of the joints of the skeletal structure of the 3D model are estimated using anthropometric analysis of the skeletal structure, and then an estimated 3D model is generated.

Next, the standard human body model generated at steps S110 to S170 is transferred to the 3D model, reconstructed at step S220, at step S240.

Thereafter, unique response relationships based on the joint control angles of the joints are collected from the 3D model. Further, the parameter values of the parametric shape control engine change so that appearance deformations based on the unique motion of the actor can be incorporated using information about the unique response relationships at step S250.

Further, the texture information of the multi-view image examples of the actor is applied as weights of visibility, and thus a texture map for the standard human body model is corrected at step S260.

A unique human body model, in which even a deformed portion of the unique appearance of the actor based on motion has been reconstructed at steps S210 to S260, is generated at step S270.

As described above, in the apparatus and method for generating a digital clone according to the present invention, some or all of the above-described embodiments may be configured to be selectively combined with each other to enable various modifications, without the application of the constructions and schemes of the embodiments having to be limited.

According to the present invention, even a deformed portion of the unique appearance of an actor based on the motion of the actor is reconstructed, together with the motion, thus realistically reproducing the behavioral expression of the actor.

Further, the present invention generates a standard human body model, in which the appearance deformation characteristic information of a human body is incorporated according to the control of the posture of the skeletal structure, on the basis of various examples, and transfers the standard human body model to the unique appearance of the actor, so that copies of appearance deformations based on the unique behavior of an existing actor can be automatically generated. That is, the present invention can promptly and easily generate a digital clone in which the appearance deformations of the actor based on the unique behavior of the actor are incorporated.

Furthermore, the present invention can generate a digital clone in which the deformations of a realistic appearance shape can be desirably incorporated even if joints are excessively controlled.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for generating a digital clone, comprising:
a standard human body model generation unit for extracting information about appearance deformations based on joint control angles of joints from posture-based appearance deformation examples, generating a parametric shape control engine in which the appearance deformation information is incorporated, and incorporating the parametric shape control engine in a standard mesh-type human body model, thus generating a standard human body model; and
a unique human body model generation unit for receiving multi-view image examples based on a change in a posture of an actor as input, generating a three-dimensional (3D) model of the actor based on the multi-view image examples, and transferring the standard human body model to the 3D model, thus generating a unique human body model, in which unique appearance deformations of the actor based on the change in the posture of the actor are reflected,
wherein the 3D model includes estimated locations of joints of a skeletal structure,
wherein the standard human body model generation unit further comprises a texture map creation unit for creating a texture map for the standard human body model, and
the unique human body model generation unit applies texture information about the multi-view image examples as weights of visibility, and incorporates the weights in the texture map for the standard human body model using an inpainting technique,
wherein the standard human body model generation unit comprises:
a skeletal structure generation unit for receiving the standard mesh-type human body model and generating the skeletal structure of the standard mesh-type human body model;
a keyframe generation unit for generating a plurality of keyframes required to approximate the appearance of the standard mesh-type human body model along the skeletal structure; and
a parametric shape control engine generation unit for extracting the appearance deformation information based on the joint control angles of the joints from the posture-based appearance deformation examples, and generating a parametric shape control engine in which response relationships of sections of individual keyframes are modeled in consideration of the appearance deformation information, and
wherein the standard human body model generation unit further comprises an example-based parameter learning unit for rendering the keyframes and the skeletal structure using the response relationships, comparing rendered results with the posture-based appearance deformation examples, and then updating response parameter values of the response relationships so that errors in 3D locations of individual vertexes of a mesh structure are reduced.

2. The apparatus of claim 1, wherein the parametric shape control engine generation unit models the response relationships so that shapes of the keyframes are parametrically deformed depending on the joint control angles of the joints.

3. The apparatus of claim 2, wherein the parametric shape control engine generation unit models the response relationships so that the shapes of the keyframes are deformed by responding to joint control angles of joints neighboring each relevant joint in a multi-response manner.

4. The apparatus of claim 1, wherein:
each of the keyframes is formed to include a center point intersecting the skeletal structure and feature points at which a 3D plane of the keyframe intersects meshes of the standard mesh-type human body model, and
the plurality of keyframes are configured to include joint keyframes intersecting the joints of the skeletal structure.

5. The apparatus of claim 4, wherein the parametric shape control engine assigns a degree of freedom, which is parametrically deformed depending on the joint control angles, to the joint keyframes so that 3D location values of the joint keyframes change depending on the joint control angles of the joints.

6. The apparatus of claim 4, wherein the parametric shape control engine performs control such that a length of radii from the center point of each keyframe to the feature points changes depending on the joint control angles.

7. The apparatus of claim 1, wherein the unique human body model generation unit comprises:
   an appearance reconstruction unit for receiving the multi-view image examples of the actor, reconstructing 3D geometric appearance information of the actor, and then generating the 3D model;
   a posture estimation unit for estimating locations of joints of the skeletal structure of the 3D model using anthropometric analysis of the skeletal structure, and then generating an estimated 3D model;
   a standard human body model transfer unit for collecting unique response relationships based on the joint control angles of the joints from the 3D model, and transferring the standard human body model to the estimated 3D model to correspond to the estimated 3D model; and
   a parameter adaptation unit for changing parameter values of the parametric shape control engine so that appearance deformations based on a unique motion of the actor can be reflected using information about the unique response relationships collected by the standard human body model transfer unit.

8. A method of generating a digital clone, comprising:
   receiving a standard mesh-type human body model;
   extracting information about appearance deformations based on joint control angles of joints from posture-based appearance deformation examples;
   generating a parametric shape control engine in which the appearance deformation information is incorporated;
   generating a standard human body model by incorporating the parametric shape control engine in the standard mesh-type human body model;
   creating a texture map for the standard human body model;
   receiving multi-view image examples based on a change in posture of an actor;
   analyzing three-dimensional (3D) geometric appearance information of the actor using the multi-view image examples, and then reconstructing a 3D model;
   transferring the standard human body model to the 3D model, and then generating a unique human body model in which unique appearance deformations based on the change in the posture of the actor are reflected; and
   applying texture information about the multi-view image examples as weights of visibility, and incorporating the weights in the texture map for the standard human body model using an inpainting technique, wherein the 3D model includes estimated locations of joints of a skeletal structure,
   generating the skeletal structure of the standard mesh-type human body model to correspond to appearance information of the standard mesh-type human body model; and
   generating a plurality of keyframes required to approximate appearance of the standard mesh-type human body model along the skeletal structure
   wherein the generating the parametric shape control engine is configured to model response relationships of sections of individual keyframes in consideration of the appearance deformation information, thus generating the parametric shape control engine,
   rendering the keyframes and the skeletal structure using the response relationships; and
   comparing rendered results with the posture-based appearance deformation examples, and then updating response parameter values of the response relationships so that errors in 3D locations of individual vertexes of a mesh structure are reduced.

9. The method of claim 8, wherein the generating the parametric shape control engine is configured to model the response relationships so that shapes of the keyframes are parametrically deformed depending on the joint control angles of the joints.

10. The method of claim 9, wherein the generating the parametric shape control engine is configured to model the response relationships so that the shapes of the keyframes are deformed by responding to joint control angles of joints neighboring each relevant joint in a multi-response manner.

11. The method of claim 8, wherein:
    each of the keyframes is formed to include a center point intersecting the skeletal structure and feature points at which a 3D plane of the keyframe intersects meshes of the standard mesh-type human body model, and
    the plurality of keyframes are configured to include joint keyframes intersecting the joints of the skeletal structure.

12. The method of claim 11, wherein the parametric shape control engine assigns a degree of freedom, which is parametrically deformed depending on the joint control angles, to the joint keyframes so that 3D location values of the joint keyframes change depending on the joint control angles of the joints.

13. The method of claim 11, wherein the parametric shape control engine performs control such that a length of radii from the center point of each keyframe to the feature points changes depending on the joint control angles.

14. The method of claim 8, further comprising:
    estimating locations of the joints of the skeletal structure of the 3D model using anthropometric analysis of the skeletal structure, and then generating an estimated 3D model; and collecting unique response relationships based on the joint control angles of the joints from the 3D model, and changing parameter values of the parametric shape control engine so that appearance deformations based on a unique motion of the actor can be reflected using information about the unique response relationships.

* * * * *